UNITED STATES PATENT OFFICE.

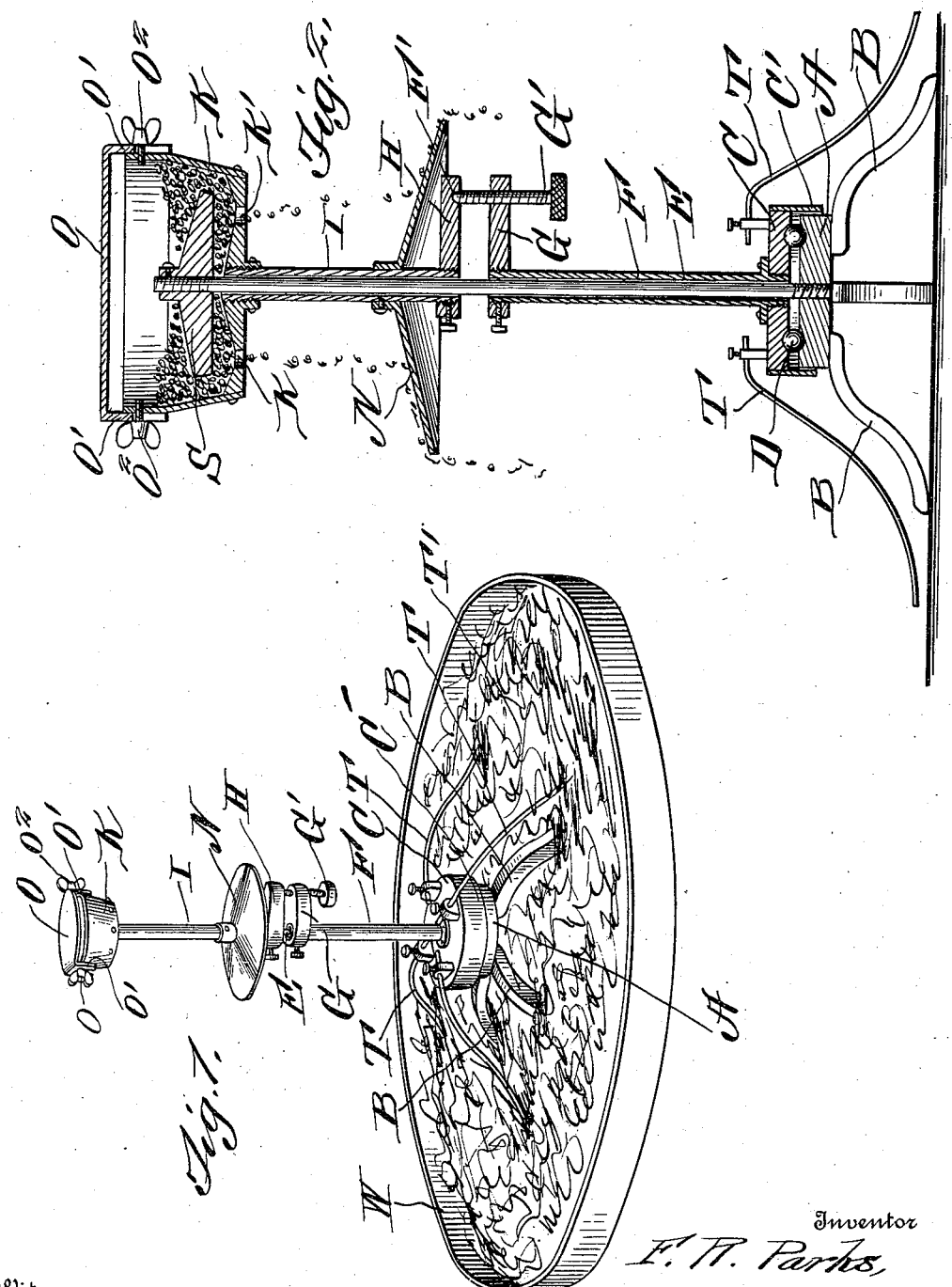

FREDERICK ROW PARKS, OF HAMBURG, NEW YORK.

AUTOMATIC POULTRY-FEEDING APPARATUS.

1,019,080.      Specification of Letters Patent.      Patented Mar. 5, 1912.

Application filed May 22, 1911. Serial No. 628,672.

*To all whom it may concern:*

Be it known that I, FREDERICK R. PARKS, a citizen of the United States, residing at Hamburg, in the county of Erie and State of New York, have invented certain new and useful Improvements in Automatic Poultry-Feeding Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatically operated poultry feeding apparatus and comprises a simple and efficient apparatus of this nature having various details of construction and combinations and arrangements of parts which will be hereinafter fully described and then specifically defined in the appended claims.

I illustrate my invention in the accompanying drawings, in which:—

Figure 1 is a perspective view of a feeding apparatus made in accordance with my invention, and Fig. 2 is a vertical sectional view.

Reference now being had to the details of the drawings by letter, A designates a disk having legs B fixed thereto adapted to support the same, and C is a disk with a flange C' about its circumference and between said disks are ball-bearings D working in grooves in said disks. Rising from said disk A is a rod or standard E, having its upper end circumferentially threaded, and a hollow tube F rises from the disk C and telescopes over said rod and projects above its upper end. A bracket arm G is fastened to the upper portion of said tube and carries a set screw G'. A second bracket arm, designated by letter H, is fastened to a tube I which telescopes over said rod. The bracket member H has an indenture F' for the reception of the end of the set screw. A hopper, designated by letter K, is mounted upon the upper end of the tube I and has slots or perforations K' therein adapted to allow said seed to fall therethrough upon the deflector N fastened to the tube H a slight distance below the hopper. A cover O, having arms O', is held by means of set screws to the hopper and is provided for the purpose of preventing fowl having access to the contents of the hopper.

A disk S is fastened to the upper threaded end of the rod and is adapted to regulate the feeding of the seed by the raising and lowering of the hopper through the medium of the set screw and the bracket arms as described.

Projecting from the upper surface of the disk C are the arms T which are preferably to be embedded in straw T' surrounding the lower portion of the hopper and in which the seed is adapted to fall. Said arms T will cause the hopper to rotate when the hens scratch in the straw and move the arms. An inclosure, designated by letter W, which may be circular or other shape, surrounds the device and confines the straw within a limited space.

The operation of my invention will be readily understood and is as follows:—The seed being placed within the hopper will fall through the openings in the bottom thereof, the quantity being fed to be determined by the amount of space left between the disk fitted to the threaded end of the rod and the bottom of the hopper. As the hens scratch for the seed in the straw about the lower portion of the device, the disk C and the parts carried thereby will be given a rotary movement which will have a tendency to cause the seed to be readily fed and dropped to the ground.

What I claim to be new is:—

1. An automatic poultry feeding apparatus, comprising a standard with its upper end threaded, a tube telescoping over said standard, a disk fitted to said standard, arms projecting from the disk, forming means whereby the disk may be rotated, a hopper, a tube projecting from an opening in the bottom thereof and adapted to telescope over said standard, a disk mounted upon the threaded end of the standard and positioned within the hopper, and means for raising and lowering the hopper.

2. An automatic poultry feeding apparatus, comprising a standard with its upper end threaded, a tube telescoping over said standard, a disk fitted to said standard, arms projecting from the disk, forming means whereby the disk may be rotated, a hopper, a tube projecting from an opening in the bottom thereof and adapted to telescope over said standard, a disk mounted upon the threaded end of the standard and positioned within the hopper, a bracket arm fixed to said tube which rises from the disk, a thumb screw carried by said bracket arm, a bracket member mounted upon the tube which telescopes over a portion of the standard and against which the thumb screw is adapted to bear.

3. In combination with a standard, a disk upon which the latter is supported, legs upon the disk, a tube telescoping over the standard, a disk fastened to said tube and having a flange extending over the disk supporting the standard, ball-bearings between the disks, arms projecting from the disk to which said tube is fastened, a hopper, a tube communicating with an aperture in the perforated bottom of the hopper and telescoping over the upper end of the standard, and means for regulating the feeding of the seed from the hopper.

4. In combination with a standard, a disk upon which the latter is supported, legs upon the disk, a tube telescoping over the standard, a disk fastened to said tube and having a flange extending over the disk supporting the standard, ball-bearings between the disks, arms projecting from the disk to which said tube is fastened, a hopper, a tube communicating with an aperture in the perforated bottom of the hopper and telescoping over the upper end of the standard, means for regulating the feeding of the seed from the hopper, a disk fitted to the upper end of the standard and positioned in the hopper, brackets fastened one to each of the tubings which telescope over the standard, and a thumb screw mounted in a threaded apparatus in one bracket member and bearing against the other bracket member.

5. An automatic poultry feeding apparatus comprising a standard, a tube telescoping over the same and rotatable thereon, a hopper with a perforated bottom, a tube communicating with an opening in the bottom of the hopper and telescoping over said standard, a protecting device fastened over the hopper, a deflector fastened to the tubing which communicates with the hopper, a disk upon the hopper end of the standard and positioned in said hopper, and means for adjusting the hopper.

6. An automatic poultry feeding apparatus comprising a standard, a tube telescoping over the same and rotatable thereon, a hopper with a perforated bottom, a tube communicating with an opening in the bottom of the hopper and telescoping over said standard, a protecting device fastened over the hopper, a deflector fastened to the tubing which communicates with the hopper, a disk upon the upper end of the standard and positioned in said hopper, means for adjusting the hopper, arms rotatable about the standard, and an inclosure about the lower portion of the apparatus.

In testimony whereof I hereunto affix my signature in the presence of two witnesses.

FREDERICK ROW PARKS.

Witnesses:
EMMA A. PARKS,
DANIEL McCARTHY.

---

Copies of this patent may be obtained for five cents each, by addressing the "Commissioner of Patents, Washington, D. C."